(12) United States Patent
Koutsky et al.

(10) Patent No.: US 7,444,700 B2
(45) Date of Patent: Nov. 4, 2008

(54) SEAT CUSHION WITH INTEGRAL COVER ATTACHMENT

(75) Inventors: L. John Koutsky, Milan, IL (US); William Tuman, Colona, IL (US); Lysle R. Hinkhouse, Wilton, IA (US)

(73) Assignee: Sears Manufacturing Co., Davenport, IA (US)

( * ) Notice: Subject to any disclaimer, the term of this patent is extended or adjusted under 35 U.S.C. 154(b) by 264 days.

(21) Appl. No.: 10/970,599

(22) Filed: Oct. 21, 2004

(65) Prior Publication Data

US 2006/0085915 A1    Apr. 27, 2006

(51) Int. Cl.
*A47C 27/14* (2006.01)

(52) U.S. Cl. ............................................. 5/653; 5/653
(58) Field of Classification Search .................. 5/652, 5/653, 655.9, 727; 297/452.27
See application file for complete search history.

(56) References Cited

U.S. PATENT DOCUMENTS

| | | | |
|---|---|---|---|
| 4,116,736 A | 9/1978 | Sanson | |
| 4,405,681 A | 9/1983 | McEvoy | |
| 4,501,541 A | 2/1985 | Bethell | |
| 4,542,887 A | 9/1985 | Bethell | |
| 4,618,532 A | 10/1986 | Volland | |
| 4,726,086 A | 2/1988 | McEvoy | |
| 4,743,323 A | 5/1988 | Hettinga | |
| 4,755,411 A * | 7/1988 | Wing et al. | 428/71 |
| 4,828,325 A | 5/1989 | Brooks | |
| 4,831,697 A | 5/1989 | Urai | |
| 4,840,430 A | 6/1989 | Shimada | |
| 4,860,415 A | 8/1989 | Witzke | |
| 4,873,036 A | 10/1989 | Urai | |
| 4,883,318 A | 11/1989 | Adachi | |
| 4,968,376 A | 11/1990 | Shimada | |
| 4,995,926 A | 2/1991 | Urai | |
| 4,999,068 A | 3/1991 | Chiarella | |
| 5,017,115 A | 5/1991 | Yanagishita | |
| 5,112,542 A | 5/1992 | Beer | |
| 5,176,860 A * | 1/1993 | Storch | 264/46.6 |
| 5,573,305 A | 11/1996 | Storch | |
| 5,788,332 A | 8/1998 | Hettinga | |
| 6,125,521 A | 10/2000 | Stempf | |
| 6,764,621 B2 * | 7/2004 | Schwaighofer | 264/46.5 |

FOREIGN PATENT DOCUMENTS

DE    3823584 A1    1/1990

* cited by examiner

*Primary Examiner*—Fredrick Conley
(74) *Attorney, Agent, or Firm*—Niro, Scavone, Haller & Niro

(57) ABSTRACT

A seat cushion is provided having a foam cushion body with a perimeter section. A cover is disposed over the body and has a border that extends around the periphery of the cushion body and juxtaposed with the perimeter section of the cushion body. An insert is positioned within the cushion body and has an outer wall extending along and spaced from the periphery of the cushion body to accommodate the cushion body perimeter section. The perimeter section has a foam density greater than that of the main cushion body and the border of the cover is bonded directly to this perimeter section. In addition, a support wall or pan is used having a size and configuration to receive the covered cushion with the border of the cover disposed within the support wall when the seat is fully assembled. A method of forming such a seat cushion is also disclosed.

3 Claims, 1 Drawing Sheet

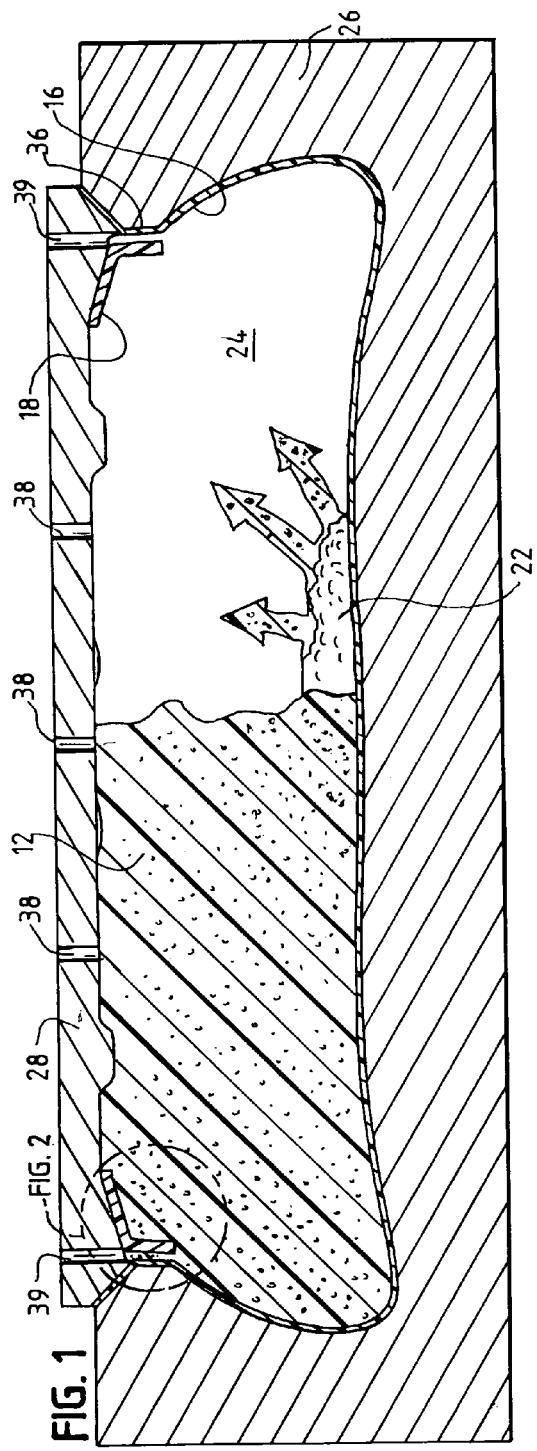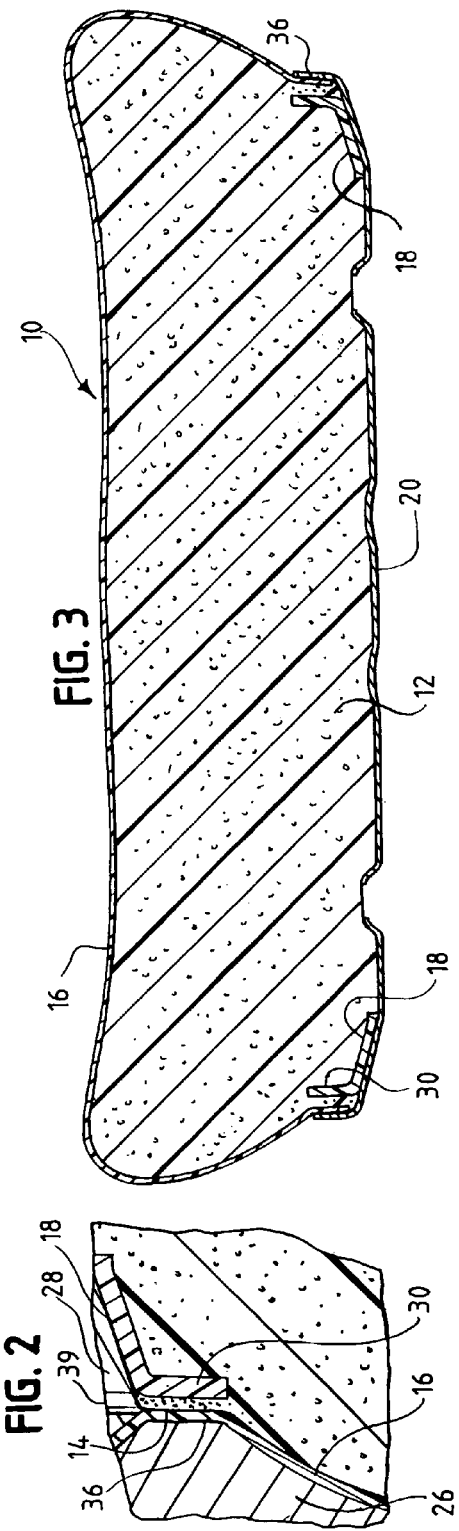

SEAT CUSHION WITH INTEGRAL COVER ATTACHMENT

BACKGROUND OF THE INVENTION

The present invention relates generally to seat technology. More specifically, the invention relates to a covered seat cushion having an integrated cover attachment arrangement.

A very common type of seat used in cars, trucks and off the road vehicles is one having a foam cushion body covered with a fabric or plastic film. One of the problems associated with such seats is how the border of the cover is to be attached to the cushion body. Known techniques include the use of staples, clips and a variety of other mechanical retention devices. Adhesives have also been utilized, and some prior art teaches that the cover may be joined to the body during the foaming and molding of the cushion. One of the problems with this latter molding technique is that the foam used for the cushion body may not have suitable physical characteristics to reliably hold the cover border in place throughout the useful life of the seat.

SUMMARY OF THE INVENTION

The present invention is directed to a seat having a cushion body and a cover in which the cover border is bonded directly to the cushion body while the cushion body is being foam molded. In addition to the cushion body and cover, the seat also includes an insert that is situated in the cushion body at the time it is foamed and molded. The insert includes an outer wall that extends around the periphery of the cushion body, but is spaced from it to define a relatively small and thin perimeter section of the cushion body between the insert and the cover. The perimeter section has a foam density greater than that of the main cushion body and, as a result, its physical characteristics useful for retaining the cover border are enhanced.

The present invention is also directed to a method for manufacturing a seat cushion having a cushion body, cover and integrated cover attachment arrangement as just described. In accordance with this method, a two part mold is provided which forms a mold cavity. The cover is first placed within one of the mold parts and the second mold part is then placed to close and thereby define the cavity. An insert is positioned within the mold cavity with an outer wall of the insert extending around and spaced slightly from the periphery of the cavity. A suitable resin is then injected or poured into the cavity and allowed to foam and thereby fill the entire cavity. Because the space between the insert outer wall and the periphery of the cavity is small, the foam in this perimeter section of the cushion body has a smaller cell structure and therefore has a greater density than the foam in the main cushion body. As a result, the physical characteristics of the foam in this perimeter section are better suited to hold the cover border in place.

In accord with one preferred embodiment of the invention, a seat cushion is provided having a foam cushion body with a perimeter section. A cover is disposed over the body and has a border that extends around the periphery of the cushion body and juxtaposed with the perimeter section of the cushion body. An insert is positioned within the cushion body and has an outer wall extending along and spaced from the periphery of the cushion body to accommodate the cushion body perimeter section. The perimeter section has a foam density greater than that of the main cushion body and the border of the cover is bonded directly to this perimeter section. In addition, a support wall or pan is used having a size and configuration to receive the covered cushion with the border of the cover disposed within the support wall when the seat is fully assembled.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is a cross-sectional view showing one seat cushion embodiment of the present invention as formed in a suitable mold;

FIG. 2 is an enlarged cross-sectional view of the circled portion of FIG. 1; and FIG. 3 is a cross-sectional view showing the covered seat cushion assembled to a support pan.

DETAILED DESCRIPTION OF THE PREFERRED EMBODIMENTS

In accordance with one preferred embodiment of the present invention a foamed vehicle seat cushion is designated generally as 10 and includes a foam body 12, a foam body perimeter section 14, a cover 16, an insert 18 and cushion support wall or pan 20.

The cushion body 12 is fabricated in the conventional manner using any one of a variety of foam resins well known in the art. Polyurethane resins are particularly preferred. Exemplary polyurethane formulations useful in the practice of the present invention are well known to those of the skill in the art. See, *Flexible Polyurethane Foams* by Herrington and Hock, Chapter 11, published by the Dow Chemical Company (1997). An initially liquid resin charge 22 is poured into a mold cavity 24, formed by first and second mold parts, 26 and 28, and allowed to foam and expand to fill the entirety of the cavity. The second mold part 28 is provided with vents 38 to allow air within cavity 24 to escape as the foam expands.

The cover 16 may be fabric or polymeric film or a fabric backed polymeric film. It is placed in the cavity of the first mold part 26, before the resin is poured, and may be held against the mold cavity wall by vacuum in a conventional and well known manner.

The insert 18 is positioned within the cavity, typically by securing it to the mold cover or second mold part 28. The insert 18 includes an outer wall 30 which extends around the periphery of the cushion body 12. The outer wall 30 is spaced a small distance from the mold cavity wall and cover to allow formation of a relatively thin cushion perimeter section 14 having a smaller foam all size and higher density than the main body of the cushion. As a result, its cohesive strength and ability to effectively secure the border 36 cover 16 are enhanced. To achieve the desired properties for the perimeter section when using a polyurethane foam it has been found that the cross dimension of the perimeter section should be between about 2.5 and 5.5 millimeters. When this cross dimension is too small, then the resin is less likely to fill the entire space between the insert outer wall 30 and the cover border 36. This can result in voids which cause separation of the cover border. On the other hand, if the cross dimension is too large, the cell structure of the resulting foam will be too large and the physical properties necessary for retention of the boarder 36 may be jeopardized. In order to insure complete and uniform foaming in the cushion perimeter section, the second mold part 28 is provided with vent holes 39 around the mold cavity and aligned with the perimeter section.

The insert 18 may be made from metal or plastic, although high strength plastic is preferred. It is required to select a material for the insert that will adhere well to the particular polyurethane foam employed. The insert, of course, remains a part of the finished cushion and can be used to mechanically secure the cushion to the support pan 20 using any conventional fastening technique. Although an angled cross-section is illustrated for the insert 18, other configurations (i.e. bars, tubes or channels) may prove suitable. It is, however, preferred that the cross dimension of the perimeter section 14 remain substantially constant around the entire periphery of the cushion body.

After the cushion body and cover are removed from the mold cavity, the excess border may be easily trimmed and the covered cushion may then be assembled to support pan 20.

When the covered cushion is finally assembled, the cover border 36 is captured within the support pan 20 and the cushion is slightly compressed to form a clamp fit and provide further mechanical retention of the border.

It will be appreciated by those skilled in the art that various changes and modifications can be made to the illustrated embodiments without departing from the spirit of the present invention. All such modifications and changes are intended to be covered by the appended claims.

We claim:

1. A seat cushion comprising:
   a unitary foam cushion formed in a one stage foaming operation and having a body with a first foam density and a perimeter section with a second foam density higher than said first foam density, said perimeter section having an outer surface defining a periphery of the cushion;
   a cover disposed over the cushion and having a border extending around the periphery of the cushion;
   an insert molded within the cushion and having an outer wall extending along, parallel to and spaced from the periphery of the cushion thereby forming a boundary between the body and perimeter section of the cushion so that the first foam density cushion body engages one side of the insert outer wall and the second foam density perimeter section engages the other side of the insert outer wall, and said outer wall thereby defining the perimeter section as having a relatively small and generally uniform cross dimension;
   the cover being bonded to the periphery of the cushion; and
   a cushion support wall having a size and configuration to receive the cushion and cover, with the border of the cover disposed within the support wall.

2. The seat cushion of claim 1 wherein the outer wall of the insert comprises one leg of a generally L-shaped insert cross section.

3. The seat cushion of claim 2 wherein the other leg of the insert cross section is positioned generally parallel to a portion of the cushion support wall.

* * * * *